US010591806B2

(12) United States Patent
Tiefenbrunn

(10) Patent No.: US 10,591,806 B2
(45) Date of Patent: Mar. 17, 2020

(54) CAMERA SYSTEM WITH IMPROVED LEVELING DISPLAY

(71) Applicant: Larry J Tiefenbrunn, East Brunswick, NJ (US)

(72) Inventor: Larry J Tiefenbrunn, East Brunswick, NJ (US)

( * ) Notice: Subject to any disclaimer, the term of this patent is extended or adjusted under 35 U.S.C. 154(b) by 0 days.

(21) Appl. No.: 16/030,860

(22) Filed: Jul. 10, 2018

(65) Prior Publication Data

US 2019/0011811 A1    Jan. 10, 2019

Related U.S. Application Data

(60) Provisional application No. 62/530,832, filed on Jul. 10, 2017.

(51) Int. Cl.
| | | |
|---|---|---|
| *G03B 17/56* | (2006.01) |
| *F16M 11/08* | (2006.01) |
| *G01C 9/04* | (2006.01) |
| *G08B 5/36* | (2006.01) |
| *G01C 9/06* | (2006.01) |
| *F16M 13/00* | (2006.01) |
| *G03B 17/18* | (2006.01) |
| *F16M 11/20* | (2006.01) |

(52) U.S. Cl.
CPC .......... *G03B 17/561* (2013.01); *F16M 11/08* (2013.01); *F16M 13/00* (2013.01); *G01C 9/04* (2013.01); *G01C 9/06* (2013.01); *G08B 5/36* (2013.01); *F16M 11/2078* (2013.01); *G03B 17/18* (2013.01)

(58) Field of Classification Search
CPC .. G03B 17/561; G03B 17/18; F16M 11/2078; G08B 5/36; G01C 9/04; G01C 9/06
See application file for complete search history.

(56) References Cited

U.S. PATENT DOCUMENTS

| | | | | |
|---|---|---|---|---|
| 5,524,352 A | * | 6/1996 | Rando .................... | G01B 11/26 33/291 |
| 6,088,623 A | * | 7/2000 | Yowler ................ | G01C 15/004 356/248 |

* cited by examiner

*Primary Examiner* — Clayton E. LaBalle
*Assistant Examiner* — Linda B Smith
(74) *Attorney, Agent, or Firm* — Henry I. Schanzer

(57) ABSTRACT

A tripod head for supporting a camera includes an electronic leveling and display system to produce a continuously visible display of the leveling of the tripod head and the camera mounted thereon. That is, the tripod head may be rotated (a full 360 degrees) so the display system is visible regardless of the position of the camera. The display system attached to, or made part of, the tripod head includes light indicating elements (e.g., LEDs or LCDs) which may be easily seen, day or night and under physical constraints limiting access to the camera, regardless of the orientation of the camera.

4 Claims, 7 Drawing Sheets

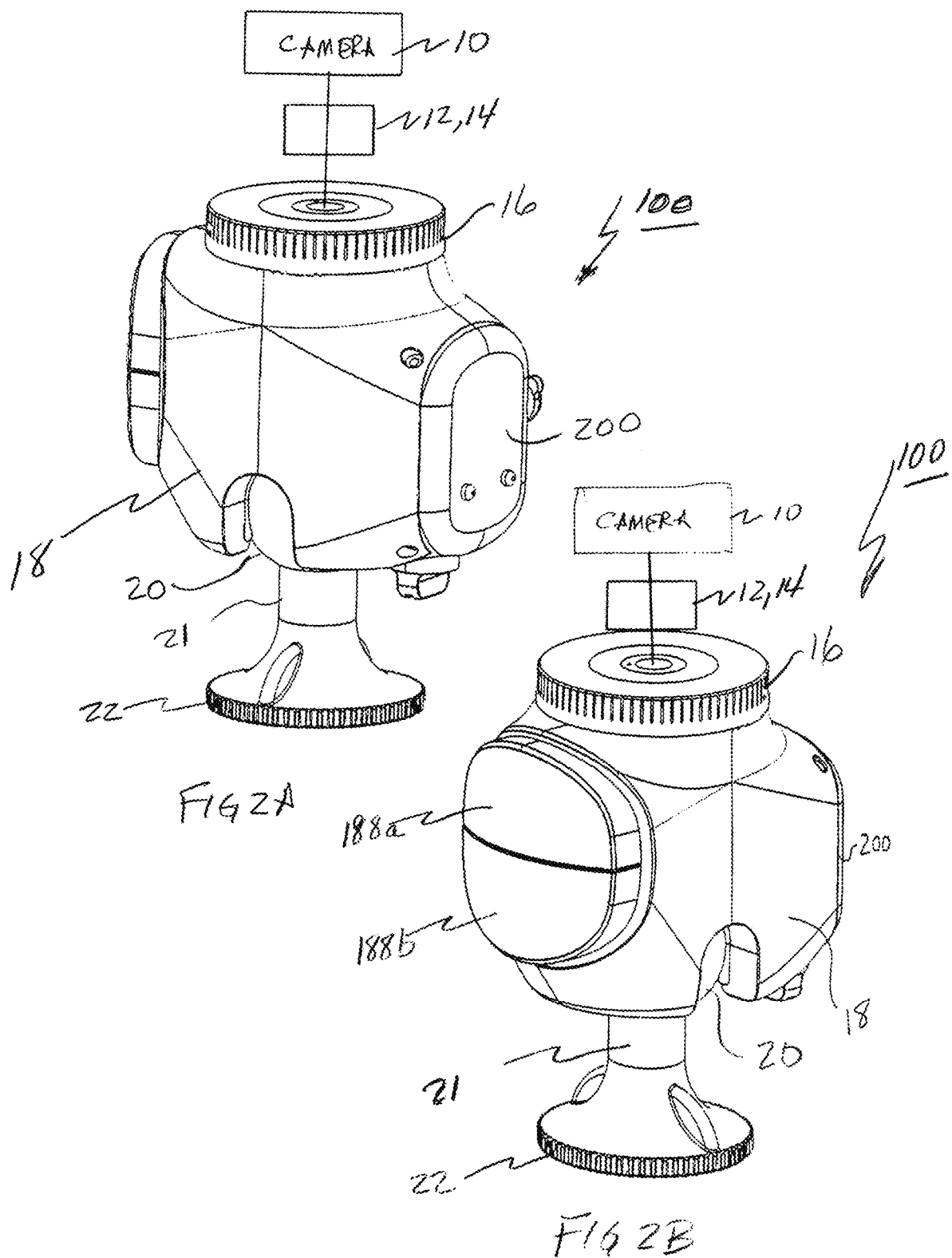

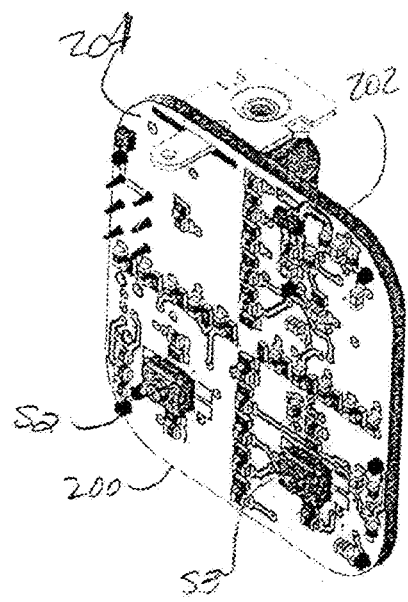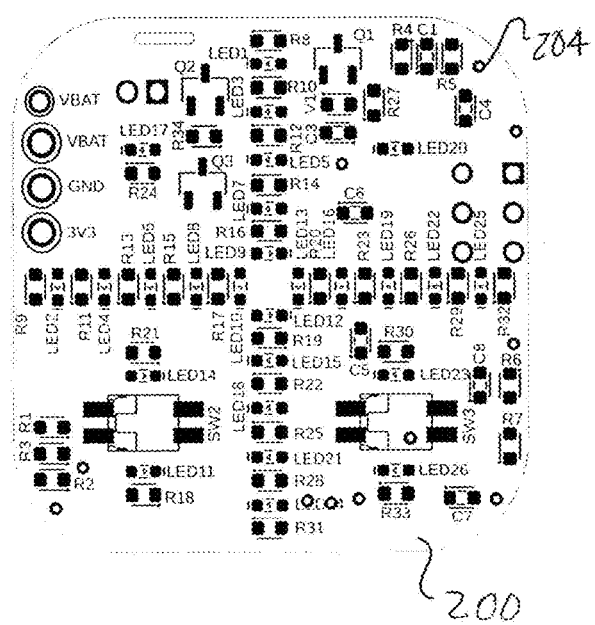
FIG. 3B
FIG. 3A

CAMERA SYSTEM WITH IMPROVED LEVELING DISPLAY

This application claims priority based on a provisional application titled CAMERA SYSTEM WITH IMPROVED LEVELING DISPLAY bearing Ser. No. 62/530,832 filed Jul. 10, 2017 whose teachings are incorporated herein by reference.

BACKGROUND OF THE INVENTION

This application relates to an improved camera support system with leveling capability in which the leveling of the camera is continuously sensed and displayed so as to be easily viewable at all times by a user.

A tripod ball head mounted on tripod legs may be used to stabilize and manipulate camera equipment mounted on and about the tripod head. Commonly, the stabilizing device may include a small bubble level mounted atop the device to allow a user to level off the camera allowing for straight horizon lines and vertical building lines. The problem with such units is that once the camera is mounted, it is difficult to see the bubble level. Also, it is difficult to view at night.

A camera may include its own leveling sensing and display system. However, the camera's leveling and display system may not be accessible and/or viewable to a user when the camera is, for example, mounted against a wall or within a compartment or in any situation which prevents viewing the camera's display system.

SUMMARY OF THE INVENTION

These problems and other issues are resolved in camera support systems embodying the invention by the use of sensitive and viewable electro-optic systems employing electronic leveling sensors connected to a viewable (e.g., surface mounted LED) display allowing leveling in both horizontal and vertical orientations. The system can be powered by one or more internal batteries that are user serviceable.

Applicant's invention relates to a camera support system in which a camera is mounted on a tripod ball head. The tripod head includes an electronic leveling and display system to produce a continuously visible display of the leveling of the tripod head and the camera mounted thereon. That is, the tripod head may be rotated (a full 360 degrees) so the display system is visible regardless of the position of the camera. The display system attached to, or made part of, the tripod head includes light indicating elements (e.g., LEDs or LCDs) which may be easily seen, day or night and under physical constraints limiting access to the camera, regardless of the orientation of the camera.

BRIEF DESCRIPTION OF THE DRAWINGS

In the accompanying drawings which are not drawn to scale like reference characters denote like components.

FIGS. 2A and 2B are simplified isometric drawings of a tripod head with a display device embodying the invention;

FIGS. 3A, 3B and 3C illustrate different stages of a display panel formed on an external surface of a printed circuit board (PCB) embodying the invention;

DETAILED DESCRIPTION OF THE INVENTION

Figure 1:
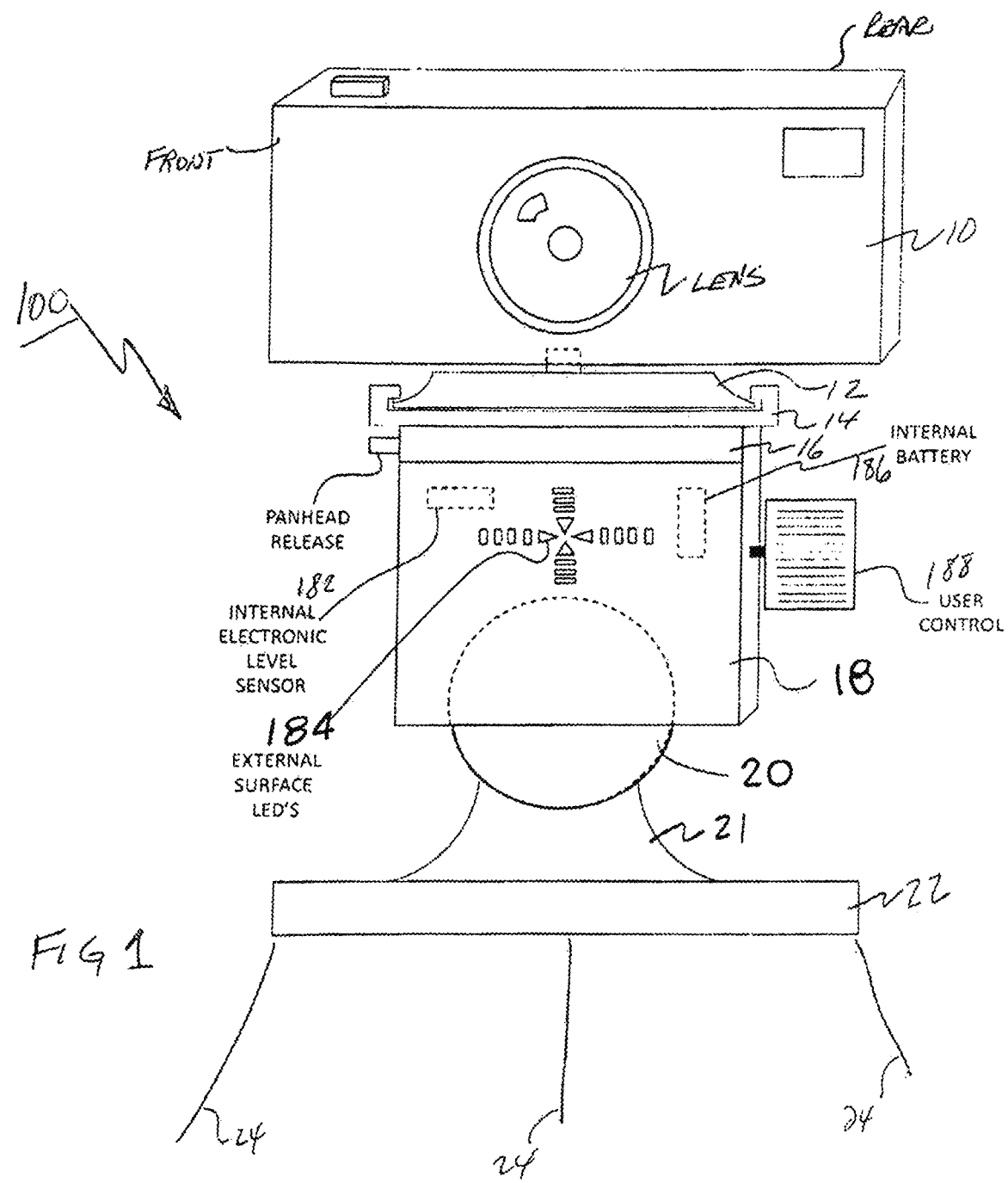
FIG. 1 is a highly simplified idealized embodiment of a camera system embodying the invention.

FIG. 1 is a highly simplified idealized drawing of a camera system embodying the invention. FIG. 1 shows a camera 10 mounted on a base plate 12 which in turn is mounted on, or attached to, a clamp 14 which is mounted on or attached to a panning mechanism 16. The panning mechanism 16 is attached to a tripod head mechanism 18 mounted on a swivel ball head 20.

As shown in FIG. 1, one surface of the tripod head 18 includes a leveling sensing and display system made up of an internal electronic level sensor 182 and external surface light emitting diodes (LEDs) 184. The LEDs 184 display leveling information in response to leveling signals produced by the level sensor 182. The LEDs are used by way of example. It should be understood that any display device or light source capable of producing a highly visible readout, by day or night, could be used instead. Also included on, or within, the tripod head 18 are one or more internal batteries 186 for powering the sensor 182 and display 184 as well as any, and all, electric and electronic components (not shown) present on or within tripod head 18. Tripod head 18 also includes a user control 188 which functions as a pressure control to tighten or loosen the tripod head 18 against the swivel ball 20, located along the underside of the tripod head, to enable a user to adjust the camera 10 to any desired angle.

The ball head 20 is shown mounted on or attached to ball neck structure 21 which terminates in top plate 22, which can be positioned on top of a tripod structure 24. The tripod structure may have any known shape suitable for holding a tripod head and swivel.

Referring to FIG. 1 note that the camera 10 may include a level sensing and display system on the back side of the camera. However, the camera's display system may not be viewable or accessible to a user facing the front (lens side) of the camera. However, since the tripod head 18 can be rotated 360 degrees relative to the camera (via the panning mechanism 16) the display system of tripod head 18 can always be made viewable to a user regardless of the orientation of the camera 10.

FIGS. 2A and 2B are simplified isometric drawings showing different views of a tripod head 18 and associated support structure embodying the invention. Referring to FIGS. 2A and 2B, there is shown a tripod head 18 mounted on a ball 20 resting on top of a ball neck structure 21 terminating in a top plate 22. As in FIG. 1, a camera 10 can be mounted on top of the tripod head 18 and secured thereto via a base plate 12 and clamp 14 to a panning rotatable mechanism 16 which is attached to the top of the tripod head. The panning mechanism 16, located between the camera 10 and the body of the tripod head 18, enables the camera to be set at a fixed viewing angle and to then be rotated 360 degrees relative to the tripod head. In FIGS. 2A and 2B control switches 188a, 188b function to selectively bind the tripod head 18 to the ball 20 or to selectively release one from the other. Switches 188a, 188b are used instead of the control knob 188 of FIG. 1.

In FIGS. 2A and 2B, a level sensing and display system is formed on a printed circuit board (PCB) 200 which may be made so as to be mounted on or fitted within the tripod head 18. PCB 200 has an internal surface 202 and an external surface 204. The external surface 204 is the surface viewable by a user, facing away from the tripod head. The internal surface 202 is the surface facing the tripod head. The PCB 200 (as shown in FIGS. 3A, 3B, 3C and 3D) may be formed such that external surface 204 functions as a display panel. That is, all display elements and features to be displayed/viewed are located on surface 204. In this embodiment, selected control switches are located on surface 204 for ease of access. These switches may alternatively be located along the edges of PCB 200. The circuit components and battery(ies) are located on the internal surface 202 of the PCB, thus allowing for maximizing the display panel surface 204 for its display surface while enabling ease of interconnection between the electronic components and the display element.

Figure 3C:
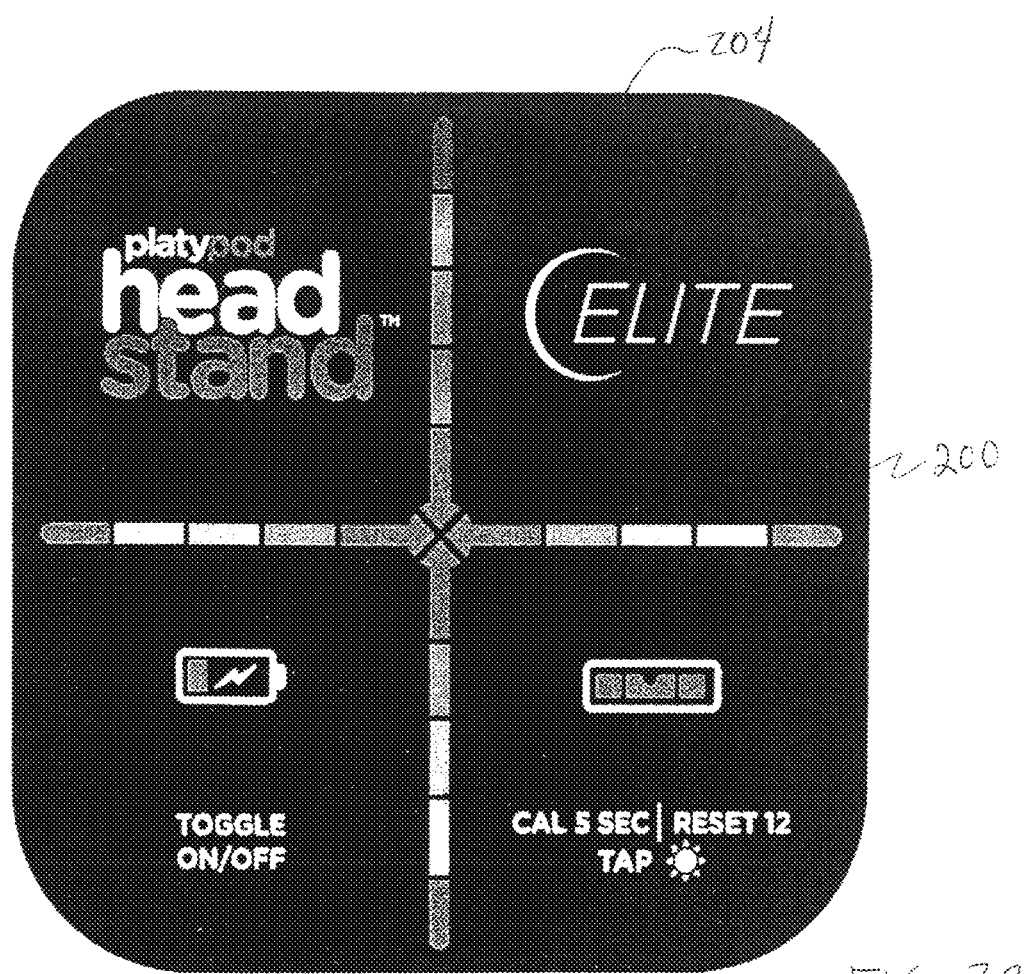
Figure 3D:
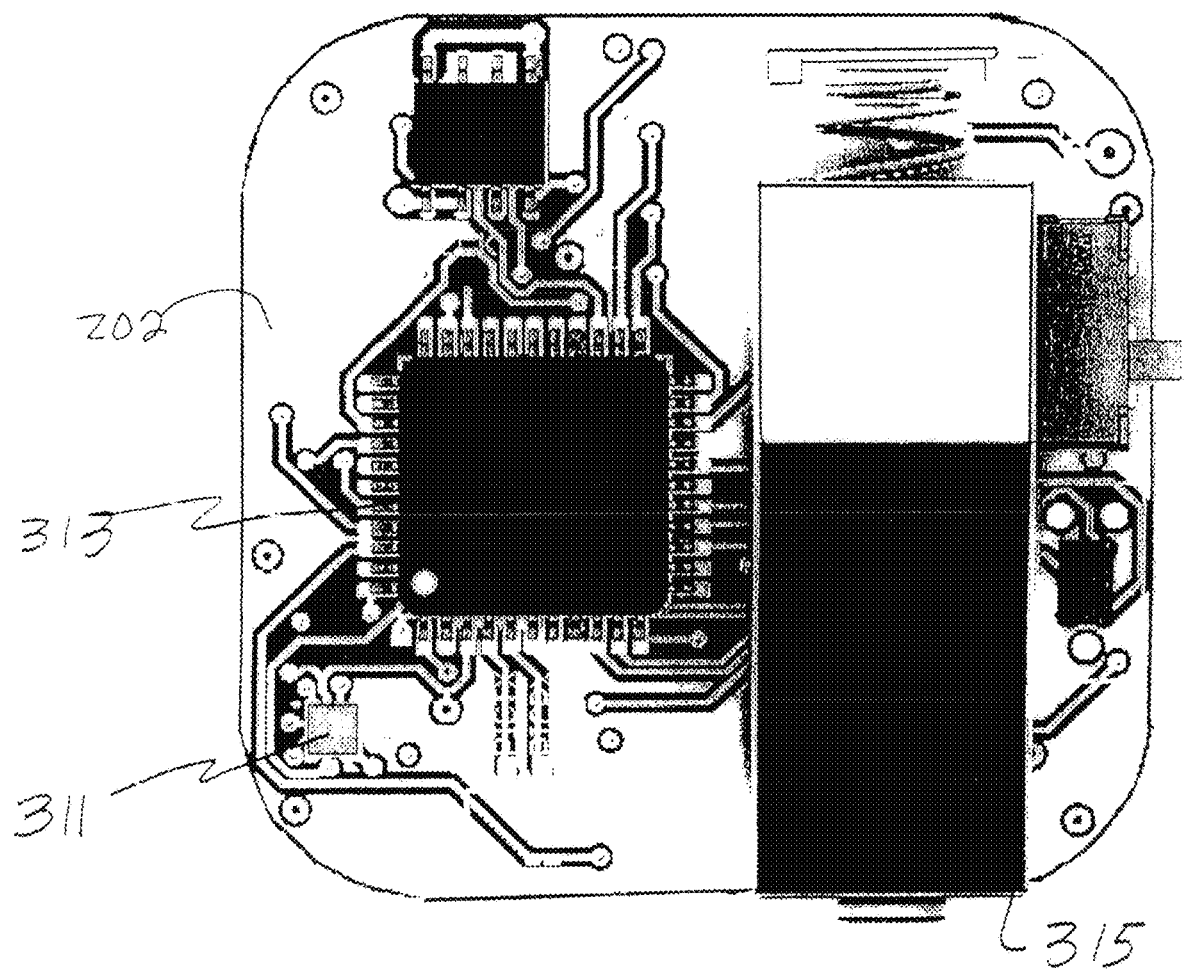
FIG. 3D is a showing of the internal surface of a printed circuit board (PCB) on which are mounted electronic and electrical components for sensing and calculating the leveling of the tripod head.

FIGS. 3A, 3B and 3C show different stages of the layout of what may be termed as the display panel 204 of the PCB 200 embodying the invention. As noted above, the printed circuit board (PCB) 200 includes selected components to enable, among others, the sensing and the determining/calculating the degree of leveling (tilting or angling) of the tripod head (to which a camera may be attached) and for displaying the leveling and other selected features.

The inner surface 202 of the PCB 200 facing the tripod includes the electronic components needed for sensing and determining/calculating the degree of leveling (tilt or tilt angle). It also includes the mechanical means for holding a battery 315 to power the electronic components. The electronic components include an accelerometer 311 and a microprocessor 313 which are interconnected and programmed to calculate leveling (or "tilting") in the vertical and horizontal directions and provide leveling information signals to the display elements 300. (Note that any known leveling sensing and calculating circuitry which can perform this function may be used in practicing the invention.)

Figure 3E:
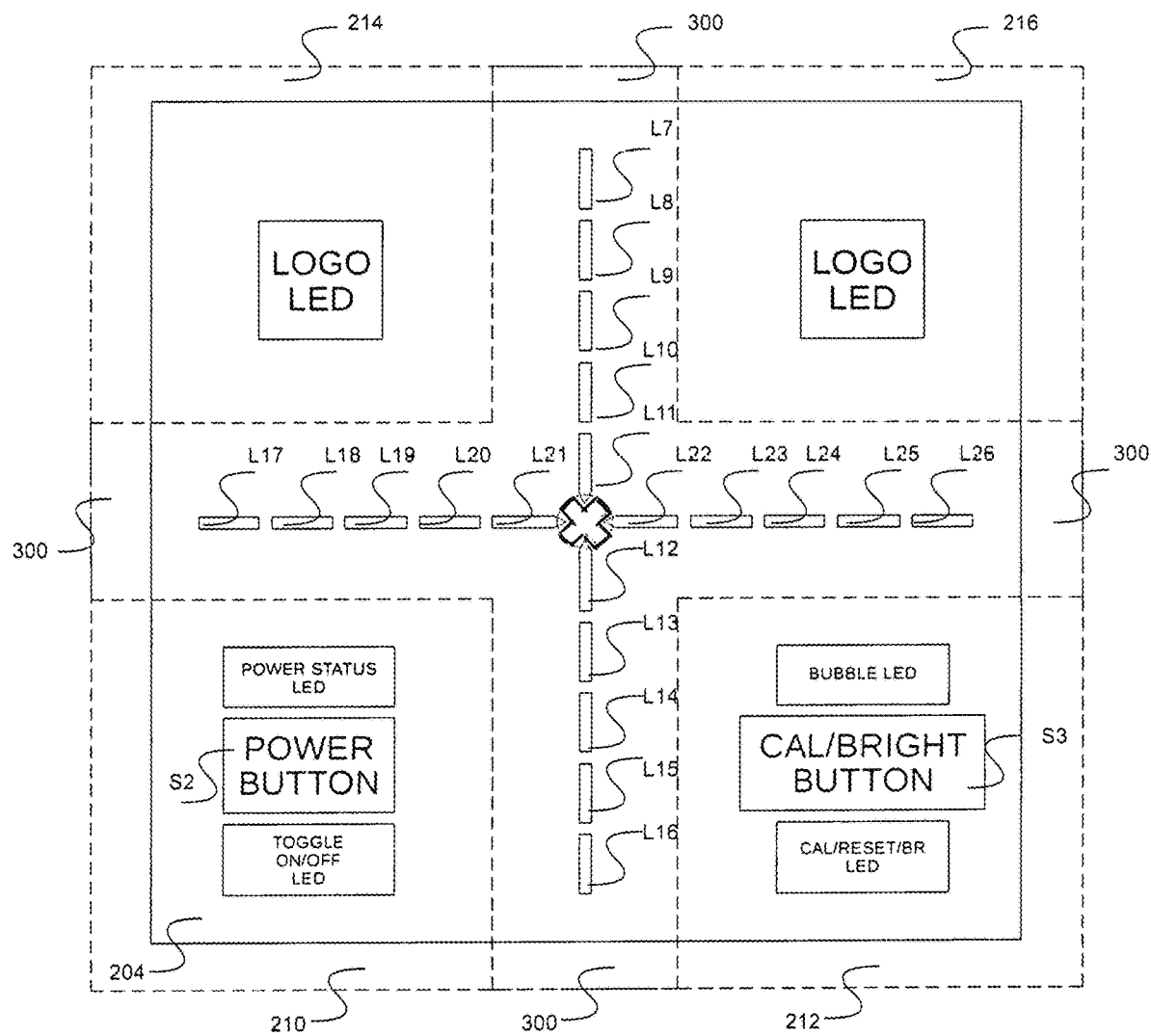
FIG. 3E is a simplified schematic representation of key switches and placement of opto-electric components formed on the PCB of FIGS. 3A, 3B and 3C.

The outer surface 204 of the PCB 200 functions as a display panel. As detailed in FIG. 3E, it includes an array 300 of LEDs laid out along the central vertical and the central horizontal portions of the PCB to display the leveling (angling or tilting). In this embodiment 10 LEDs are shown along the vertical axis and 10 LEDs are shown along the horizontal axis to indicate the leveling. This number of LEDs is generally sufficient to provide the degree of precision required. But, of course the invention could be practiced with a greater or lesser number of light elements. Also as noted above the discrete LEDs may be replaced with a Liquid Crystal display (LCD) or any other suitable light source.

The array 300 of LEDs (which may be referred to as the "leveling indicator array") enables a user to see if the camera 10 mounted on the tripod head 18 is level. The array 300 of LED lights is laid out in a cross pattern which enables a user to easily see when the camera is level. In practicing the invention, the array 300 of LEDs would indicate a true horizontal and vertical position with respect to ground when the central horizontal and vertical LEDs (e.g., LEDs L11, L12, L21, L22 in FIG. 3E) are lit up. The vertically located LEDs and the horizontally located LEDs are viewable by a user to position the camera under numerous adverse conditions when no other camera leveling system can be used.

In order to enable the LEDs of the leveling indicator array 300 to be easily seen under different light conditions a brightness control (switch S3) is included which can be used to cause the LEDs to go from low to medium to high brightness.

In operation switch S1 applies power to the system. In addition, in a section 210 of the PCB 200 there is included a toggle ON/OFF indicator LED which indicates when power switch S1 is turned on and the unit is placed in standby-mode. LEDs 300 are off at this time. Toggle ON/OFF button S2 activates deactivates the LED leveling display 300.

In a section 212 of the PCB there is included a multi-functional control switch S3 and a CAL/RESET and Brightness LED which is activated by switch S3 and a "bubble" LED which indicates calibration sequence activation. The control switch S3 may be depressed for different time periods to produce different effects. The closure of switch S3 is coupled to the microprocessor 313 which is programmed such that: (a) for one switching condition of S3, selected LEDs are made to go from low to medium to high brightness to control their brightness to enable the display to be seen better at night, during daylight and bright daylight; (b) for another switch condition of S3, the system is reset to zero for calibration against a reference level; and (c) for a third switch condition of S3, the system is caused to reset to factory default.

In section 214 of the PCB there is included a LOGO LED which backlights a logo ("platypod head stand" shown in FIG. 3C) on start up.

In section 216 of the PCB there is included a LOGO LED which backlights the "elite" logo shown in FIG. 3C, on start up.

Figure 4:
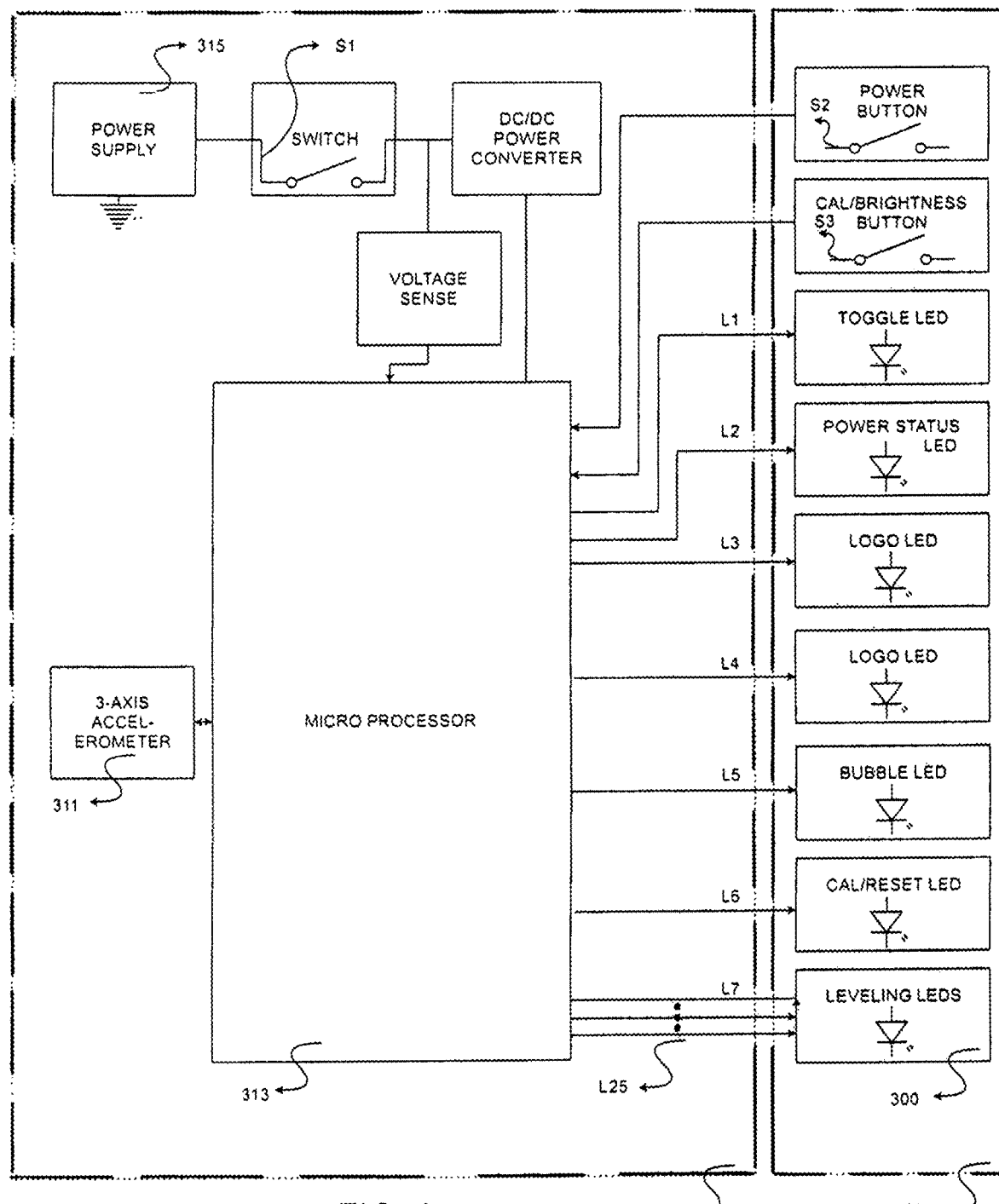
FIG. 4 is a simplified block diagram of a display system including a leveling display system embodying the invention.

FIG. 4 is a simplified block diagram of an electro-optical level sensing and display system embodying the invention corresponding to the components shown in FIGS. 3A, 3B, 3C, 3D and 3E. Corresponding to these figures, there is shown in block 202 a 3-axis accelerator 311 and a microprocessor 313. These two devices are programmed to perform a leveling sensing function and provide corresponding signals to selected display elements located on a display panel formed on surface 204. Block 202 also includes a power supply 315 which may be a battery. A Voltage sensing circuit indicates when power is below a predetermined level via the power status LED.

The operation of the camera system embodying the invention may be described as follows:

As shown in FIGS. 1, 2A and 2B, the camera support assembly 100 includes camera 10 mounted on a quick-release base plate 12 which is attached to a clamp 14 which is attached to a panning mechanism 16. The panning mechanism 16 is attached to a tripod head mechanism 18 mounted on a swivel ball head 20 attached to or mounted on ball neck base 21 terminating on plate 22.

In accordance with Applicant's invention, the camera assembly 100 can be placed in a location where any leveling information provided by the camera (or by any other component) is unavailable.

However, by applying power and turning on the display system of the invention, a user may be guided by observing the display system (and in particular the indicator level array 300) to manipulate the camera and tripod head components until the camera is oriented in a desired direction and locked in place. The electronic leveling display provides unique visibility at night or when the camera is at or above eye level or in tight spaces. Switch S2 is provided to toggle the LEDs on and off.

Self-calibrating feature. In accordance with Applicant's invention the system is programmed to have a Self-calibrating feature. This feature is desirable since the accelerometer, although it comes pre-calibrated from the factory, may have some offset when installed. To correct for any offset with a given extent, the user may calibrate the device by following this procedure:

1. The sensing device must be within 5 degrees of level to initiate the calibration process.
2. Place a reference high quality bubble leveler device on top of a tripod head embodying the invention. The leveler device may be placed on levels, 16, 14 or 12 at the user's discretion.
3. A user can then physically adjust the leveling of the tripod head both horizontally and vertically until the "even" level condition indicated by the bubble leveler device is reached.
4. The user can then press and hold a Calibration button/switch (e.g., s3) for a preset period of time (e.g., 5 to 10 seconds).
5. The user can then release the Calibration button.
6. A signal generated by the Calibration button closure is fed to the microprocessor 313 which is programmed to then receive signals for correcting any offset.
7. Following the release of the control switch, the four center LEDs 300 will turn on simultaneously when calibration is achieved.

What is claimed is:

1. The combination comprising:
a tripod head adapted to have a camera attached thereto, said tripod head including apparatus for securely attaching the camera thereto and for rotating the camera relative to the tripod head;
sensing and processing circuitry coupled to said tripod head for sensing and calculating the degree of leveling of said tripod head and producing signals indicative of the leveling; and
a display device attached to said tripod head responsive to the signals indicative of the leveling for optically displaying signals corresponding to the indicated leveling; said optical display being viewable in any selected direction regardless of the orientation of the camera attached to said tripod head; and
wherein a printed circuit board (PCB) is attached to said tripod head, said PCB having an inner surface to which said sensing and processing circuitry is connected; and said PCB having an external surface and wherein said display device is coupled to said external surface.

2. The combination as claimed in claim 1, wherein said sensing and processing circuitry is attached to said PCB; and wherein said display device is electrically and physically coupled to said external surface of said PCB.

3. The combination as claimed in claim 1, wherein said display device includes light emitting elements.

4. The combination as claimed in claim 1 wherein the processing circuitry includes means for calibrating the system.

* * * * *